Patented Mar. 17, 1931

1,797,124

UNITED STATES PATENT OFFICE

DANA W. BOWERS, OF LANSDALE, PENNSYLVANIA, ASSIGNOR OF FORTY-NINE ONE-HUNDREDTHS TO CHARLES T. ASBURY, OF PHILADELPHIA, PENNSYLVANIA

SOLDERING FLUX

No Drawing.  Application filed July 12, 1930. Serial No. 467,630.

My invention relates to a novel soldering flux and more particularly to a non-corrosive soldering flux which may be employed in soldering various materials, especially wrought and cast aluminum surfaces to other aluminum surfaces or to other metals.

One object of my invention is to provide a flux for soldering aluminum during the use of which an alloy is formed with the aluminum which firmly unites the two metals together and increases the conductivity of the union beyond that of the metals being joined.

Still another object is to provide a flux which is non-corrosive itself and which does not give rise during its use to any products which have a tendency to corrode the metals being joined.

Still another object is to provide a flux by means of which any tin-lead solder ranging in composition from pure tin to one-half tin and one-half lead may be successfully used. Other objects will be apparent from a consideration of the specification and claims.

My invention contemplates the production of a non-corrosive soldering flux which contains as one active ingredient a silver soap. The silver soap may be formed by a reaction by having present in the composition silver oxide and free fatty acid or the silver soap may be added to the compound directly. The silver soaps of the various animal and vegetable fatty acids, and more particularly the silver soaps of oleic, palmitic, and stearic acids are applicable.

The silver oxide and fatty acid or the silver soap may be dispersed in any suitable carrier such as an additional amount of fatty acid. This may be used in conjunction with beeswax or other wax, such as paraffin. In the preparation of a flux which is liquid at room temperature, a fatty acid such as oleic acid or cocoanut or palm oil may be used to which may be added, if desired, a small proportion of beeswax or other wax.

With the flux of the present invention, no corrosive action occurs since the silver soap is non-corrosive and does not give rise to undesirable products during the soldering operation. It is to be noted that no halogen or like compound is employed. When the composition of the present invention is employed, the heat which is applied in the soldering operation in contact with the aluminum reduces the silver compound to colloidal metallic silver which immediately forms a silver-aluminum alloy. The small amount of silicon always present in the aluminum does not interfere with the production of this alloy and the alloy furnishes an excellent bond between the metals being joined, for example, aluminum to aluminum or aluminum to other metal and alloys. The conductivity of the alloy and hence the conductivity of the union is greater than that of the united metals. The use of the flux enables the operator to use an ordinary copper bit although for most purposes, better results are obtained by the use of a nickel or silver soldering bit. The union may be made with the aid of a blow pipe used alone or used in conjunction with the soldering bit. The solder used may be pure tin or any tin-lead solder ranging in composition from a small amount of lead to one-half lead and one-half tin.

In a typical case, the compound may contain the following ingredients:

Oleic acid_____25 lbs. to 40 lbs.
Beeswax_____ 6 lbs. to 10 lbs.
Silver oxide_____ 1 lb. to  3 lbs.

and in a specific example, the ingredients may be used in the following proportions:

Oleic acid_____32 lbs.
Beeswax_____ 8 lbs.
Silver oxide_____ 2 lbs.

In preparing the composition, beeswax is first melted at a moderate temperature and the oleic acid and silver oxide are then added. The temperature is maintained at about 100° C. until the silver oxide is dissolved, thereby forming the silver compounds with the free fatty acids or in other words forming the silver soaps. As before pointed out, if desired, an equivalent amount of a prepared silver soap may be added such as silver oleate. It is to be noted that there is an excess of fatty acid in the above mixtures since more oleic acid is added than combined with the silver oxide and furthermore there are also fatty acids present in the beeswax. These fatty acids are excellent solvents for the metallic oxides which may be formed when the work is heated to soldering temperatures. They also protect the surfaces of the metals from oxidation to a high degree. In soldering the metals, it is desirable to preheat the parts being soldered, since the time of tinning the surfaces is greatly lessened and fouling of the work is avoided. A smaller amount of flux is also required.

In certain cases, for example in the soldering of refractory cast or wrought aluminum, the addition of a finely granulated solder to the flux paste has been found to aid in the work. The composition of the solder may vary but in a typical case, a solder compound of equal parts of lead, tin, and zinc has given good results. The percentage of solder added depends on various factors and may vary widely. Solder added in the proportion of one part of solder to one part of other materials in the paste has proven particularly successful. The presence of the solder in the flux aids in retaining the silver soap in intimate contact with the parts being soldered, and helps in the soldering operation since it is an excellent tinning composition. Furthermore, the zinc prevents a copper stain when a copper soldering bit is used, and, therefore, in this particular the solder serves as a flux. A successful soldering operation is assured using a solder of equal parts of lead and tin to complete the work.

Considerable modification is possible in the compound used and in the proportions thereof without departing from the essential features of my invention.

I claim:

1. A soldering flux having therein silver oxide and fatty acid.

2. A soldering flux having therein silver soap.

3. A soldering flux comprising a carrier, silver oxide, and fatty acid.

4. A soldering flux comprising a carrier and silver soap.

5. A soldering flux comprising a carrier including free fatty acid and silver soap.

6. A soldering flux comprising beeswax, oleic acid, and silver oxide.

7. A soldering flux comprising beeswax, oleic acid, and silver soap.

8. A soldering flux comprising beeswax 6 parts to 10 parts, oleic acid 25 parts to 40 parts, and silver oxide 1 part to 3 parts.

9. A soldering flux comprising beeswax 8 parts, oleic acid 32 parts, and silver oxide 2 parts.

10. A soldering flux comprising a carrier, silver soap, and finely granulated solder.

11. A soldering flux comprising a carrier, silver soap, free fatty acid, and finely granulated solder.

12. A soldering flux comprising a carrier, silver soap, and finely granulated solder, the solder being present in a proportion about equal to the other ingredients.

13. A soldering flux comprising beeswax 6 parts to 10 parts, oleic acid 25 parts to 40 parts, silver oxide 1 part to 3 parts, and finely granulated solder, the solder being present in a proportion about equal to the other ingredients.

14. A soldering flux comprising beeswax 6 parts to 10 parts, oleic acid 25 parts to 40 parts, silver oxide 1 part to 3 parts, and finely granulated solder, the solder being made up of approximately equal parts of tin, lead, and zinc, and being present in a proportion about equal to the other ingredients.

DANA W. BOWERS.